(12) United States Patent
Sylvester

(10) Patent No.: US 6,451,398 B1
(45) Date of Patent: *Sep. 17, 2002

(54) DOUBLE-SIDED SELF-ADHESIVE REINFORCED FOAM TAPE

(76) Inventor: Michael S. Sylvester, 31 Shoreby Dr., Bratenahl, OH (US) 44108

( * ) Notice: Subject to any disclaimer, the term of this patent is extended or adjusted under 35 U.S.C. 154(b) by 0 days.

This patent is subject to a terminal disclaimer.

(21) Appl. No.: 09/497,028

(22) Filed: Feb. 2, 2000

Related U.S. Application Data

(63) Continuation-in-part of application No. 09/198,659, filed on Nov. 24, 1998, now Pat. No. 6,190,751.

(51) Int. Cl.⁷ ............................................... B32B 33/00
(52) U.S. Cl. .................. 428/41.8; 49/479; 160/40; 277/227; 277/228; 277/233; 277/921; 296/93; 428/40.1; 428/41.7; 428/41.9; 428/66.4; 428/317.1; 428/314.4; 428/319.3; 428/319.7; 428/343; 428/346; 428/351; 428/352; 428/354
(58) Field of Search ................................ 277/227, 228, 277/233, 921; 296/93; 428/40.1, 41.7, 41.8, 41.9, 66.4, 317.1, 314.4, 319.3, 319.7, 343, 345, 346, 347, 351, 352, 354; 49/479; 160/40

(56) References Cited

U.S. PATENT DOCUMENTS

| | | |
|---|---|---|
| 4,050,145 A | 9/1977 | Benford |
| 4,060,439 A | 11/1977 | Rosemund et al. |
| 4,136,203 A | 1/1979 | Murphy et al. |
| 4,175,154 A | 11/1979 | Faust et al. |
| 4,210,693 A | 7/1980 | Regan et al. |
| 4,234,647 A | 11/1980 | Murphy et al. |
| 4,299,921 A | 11/1981 | Youssef |
| 4,554,191 A | 11/1985 | Korpman |
| 4,567,091 A | 1/1986 | Spector |
| 4,721,643 A | 1/1988 | Harayama et al. |
| 4,797,170 A | 1/1989 | Hoopengardner |
| 4,839,206 A | 6/1989 | Waldenberger |
| 4,981,755 A | 1/1991 | Caseino |
| 4,990,399 A | 2/1991 | Hoppengardner |

(List continued on next page.)

FOREIGN PATENT DOCUMENTS

| | | |
|---|---|---|
| GB | 2021038 A | 11/1979 |
| JP | 09095100 A | 4/1997 |

OTHER PUBLICATIONS

*Plastics Film Technology*, W.R.R. Park, editor, Van Nostrand Reinhold Co., prior to 1971, p. 59.
Letter (2 pages) dated Dec. 9, 1999, Re: Foam–Fix Product: Notice of Prior Art, from Doreen J. Gridley to Michael Sylvester with four pages of enclosures.
*Vinyl (PVC) Foam Standard Log Prices*, from Gaska Tape, Inc., p. 8.
*EN1101W15: Gaska Tape Product Defaults (Typical Makeup)*, from Gaska Tape, Inc., dated Jan. 25, 1997, 1 page.

*Primary Examiner*—Terrel Morris
*Assistant Examiner*—Arti Singh
(74) *Attorney, Agent, or Firm*—Pearne & Gordon LLP

(57) ABSTRACT

A double-sided self-adhesive reinforced foam tape comprising a release liner having upper and lower surfaces which are release surfaces, a first layer of pressure sensitive adhesive applied to the upper release surface, a layer of flexible polymeric film, preferably polyester film, applied to the first pressure sensitive adhesive layer, a layer of flexible foam, preferably closed cell PVC flexible foam, thermally bonded to the flexible polymeric film layer, and a second layer of pressure sensitive adhesive applied to the flexible foam layer. A length of material for use as a double-sided tape is provided, along with a method of making the length of material. An alternative embodiment, suitable for die-cutting, including a second release liner applied to the second pressure sensitive adhesive layer is provided. The tape may be used in automobiles and other applications.

24 Claims, 1 Drawing Sheet

U.S. PATENT DOCUMENTS

| | | |
|---|---|---|
| 5,330,814 A | 7/1994 | Fewell |
| 5,372,865 A | 12/1994 | Arakawa et al. |
| 5,395,668 A | 3/1995 | Ito et al. |
| 5,447,761 A | 9/1995 | Lafond |
| 5,466,535 A | 11/1995 | Higgins et al. |
| 5,476,618 A | 12/1995 | Ito et al. |
| 5,503,927 A | 4/1996 | Ragland et al. |
| 5,629,085 A | 5/1997 | Keizou et al. |
| 5,658,630 A | 8/1997 | Shizukuda et al. |
| 5,660,922 A | 8/1997 | Herridge et al. |
| 5,695,870 A | 12/1997 | Kelch et al. |
| 5,750,254 A | 5/1998 | Starkey |
| 5,830,809 A | 11/1998 | Howard et al. |
| 6,013,342 A | 1/2000 | Neto |
| 6,231,962 B1 * | 5/2001 | Bries et al. ............ 428/317.3 |

* cited by examiner

DOUBLE-SIDED SELF-ADHESIVE REINFORCED FOAM TAPE

This is a continuation-in-part of U.S. patent application Ser. No. 09/198,659, filed Nov. 24, 1998 now U.S. Pat. No. 6,190,751.

FIELD OF THE INVENTION

The invention relates generally to foam tapes and more particularly to a double-sided self-adhesive reinforced foam tape.

DESCRIPTION OF RELATED ART

Double-sided foam tape is well-known. This product is frequently a thick but narrow layer or strip of closed cell plastic flexible foam with layers of pressure sensitive adhesive on opposing surfaces. A release liner is provided on one adhesive surface. The tape is rolled, so that the lower side of the release liner contacts the other adhesive surface. In use, the tape is unrolled and the exposed adhesive surface is adhered to one of the two items that are to be held together. The release liner is then removed, exposing the second adhesive surface.

The tape is usually produced by a process starting with a substrate, laminating one side, coating that side with a pressure sensitive adhesive, flipping the product over, and repeating the process again on the other side. The extra handling of the product needed to complete these multiple steps results in a high percentage of scrap loss.

Alternatively, the tape can be produced by the methods discussed in U.S. Pat. Nos. 5,658,630 ('630 patent) and U.S. Pat. No. 5,660,922 ('922 patent), the disclosures of which are hereby incorporated by reference. However, the coextrusion process described in the '922 patent is also characterized by high scrap losses, especially during the start-up phase. Further, the product suffers from the deformation problems discussed below.

A second problem with traditional foam tapes is they are generally not reinforced. Thus, during both processing and application, especially if used in longer strips, deformation and stretching of the product can occur. The deformation also occurs due to the extra handling and constant turning of the product during manufacturing. This results in a product that can be difficult to handle and provides a less than perfect fit.

The '630 patent addresses this problem by providing a polyester film layer to help stabilize the tape. The problem with this polyester film-reinforced product is that it is expensive and laborious to produce, and requires the use of UV light to polymerize the foam. The process also requires the use of a start-up release paper, which is discarded after the foam is polymerized, thus adding to the scrap losses.

Thus, there is a need for a double-sided self-adhesive reinforced foam tape which overcomes these deficiencies in the prior art and a method to produce such an improved product that results in a smaller amount of scrap loss.

SUMMARY OF THE INVENTION

A double-sided, self-adhesive reinforced foam tape is provided, comprising a release liner having upper and lower surfaces, at least the upper of which is a release surface, a first layer of pressure sensitive adhesive applied to the upper release surface, a layer of flexible polymeric film applied to the first pressure sensitive adhesive layer, a layer of flexible foam thermally bonded to the flexible polymeric film layer, and a second layer of pressure sensitive adhesive applied to the flexible foam layer. The tape has a shape such that it may be used effectively as a double-sided self-adhesive foam tape.

A length of material suitable for die-cutting a double-sided self-adhesive reinforced foam tape therefrom is also provided. The material comprises a first release liner having an upper surface which is a release surface, a first layer of pressure sensitive adhesive applied to the release surface, a layer of flexible polymeric film applied to the first pressure sensitive adhesive layer, a layer of flexible foam thermally bonded to the flexible polymeric film layer, a second layer of pressure sensitive adhesive applied to the flexible foam layer, and a second release liner having a lower surface which is a release surface applied to the second layer of pressure sensitive adhesive. The length of material is at least 8 inches wide and at least 20 feet long. A method of making the length of material is also provided.

DETAILED DESCRIPTION OF THE PREFERRED EMBODIMENTS OF THE INVENTION

As used herein, parts are parts by weight and percents are weight percents unless otherwise indicated or apparent. When a preferred range such as 5–25 is given, this means preferably at least 5 and, separately and independently, preferably not more than 25. The contents of U.S. patent application Ser. No. 09/198,659 filed Nov. 24, 1998 now U.S. Pat. No. 6,190,751 are incorporated herein by reference in their entirety.

Figure 1:
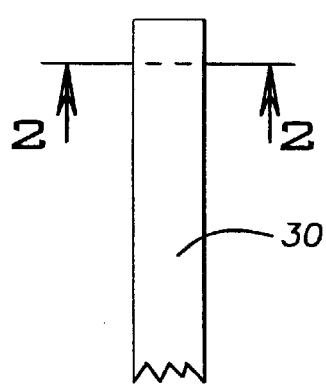
FIG. 1 is a top or plan view of a length of double-sided self-adhesive reinforced foam tape of the present invention.
Figure 2:
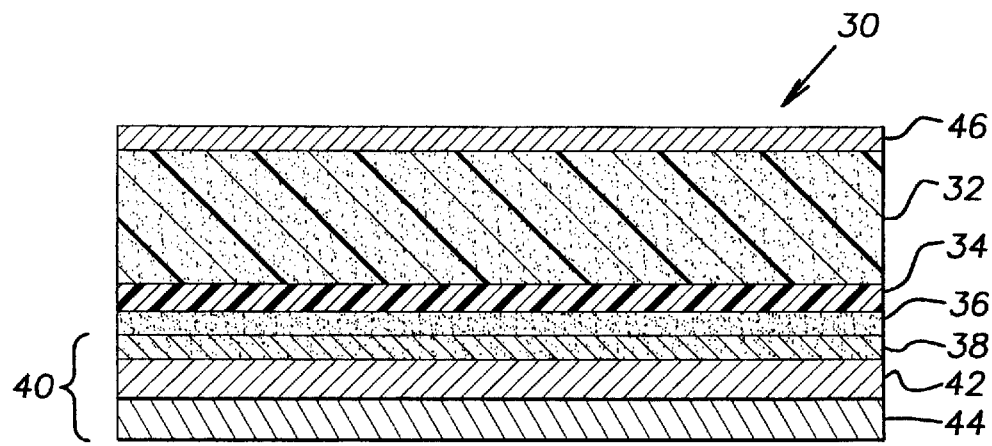
FIG. 2 is a schematic, cross-sectional view of the tape of FIG. 1 is taken along line 2—2.

With reference to FIGS. 1 and 2 there is shown a length of self-adhesive reinforced foam tape or mounting tape 30 of the present invention having a top pressure sensitive adhesive (PSA) layer 46.

With reference to FIG. 2 there is shown in cross-section a double-sided self-adhesive reinforced foam tape 30 of the present invention. Tape 30 comprises a release liner 40 comprising release paper 42 having two release (preferably silicone) coatings 38 and 44 which provide release surfaces. Thus release liner 40 has upper and lower surfaces which are release surfaces. The release paper is preferably 40–160 lb., more preferably 60–100 lb., more preferably about 78 lb., clay-coated, long-fiber, super-calandered, flat, heat resistant paper as known in the art. Plastic or polymeric film may be substituted for paper layer 42. A layer of pressure sensitive adhesive (PSA) 36 is applied to the release surface of the release coating 38. The first PSA layer 36 is preferably a high-temperature rubber-based hot melt pressure sensitive adhesive such as from Monsanto or National Starch that is heated so that it can be extruded onto the release liner. Other pressure sensitive adhesives, particularly high-temperature PSAs, known in the art can be used, such as PSAs which are 100% solids (such as silicone-based) and PSAs which have a solvent carrier which is preferably an organic liquid, less preferably water, which is evaporated after the PSA layer is applied. First PSA layer 36 is preferably 0.5–5, more preferable 1–3, more preferably about 2, mils thick. The PSA is selected such that it can withstand the heating process described hereinafter and can effectively bond to the intended substrate, which is preferably a part of an automobile, commonly a plastic part of an automobile.

Next, a layer of flexible polymeric film 34, preferably polyester film, is applied to the first PSA layer 36. Flexible polymeric film layer 34 is preferably 0.5–4, more preferably 0.7–2, more preferably 0.8–1.5, more preferably about 1, mil thick polyester film (preferably nontreated), such as Mylar brand polyester film from DuPont. Other flexible polymeric films having the strength, flexibility and temperature resistance of Mylar may also be used, such as PET polymeric film, polyvinylidene chloride polymeric film, polyacrylic film, polyvinyl chloride film, polyvinyl acetate film, polyamide film, and polyimide film. Flexible polymeric film layer 34 provides reinforcement to the tape and prevents migration of plasticizer from flexible foam layer 32 to first pressure sensitive adhesive layer 36, where it would adversely affect and degrade the PSA.

To the polymeric film layer 34 is thermally bonded a layer of flexible foam 32, preferably closed cell PVC flexible foam, less preferably other PVC foams such as lower temperature PVC foams and polymeric PVC foams, alternatively other flexible foams such as polyurethane foam, polyethylene foam, other vinyl foams, and polypropylene foam. After curing and solidifying, the flexible foam layer 32 is preferably ¹⁄₃₂ to 1 inch thick, more preferably ¹⁄₁₆ to ¾ inch thick, more preferably ⅛ to ½ inch thick, more preferably ³⁄₁₆ to ¼ inch thick.

To the flexible foam layer 32 is applied a second layer of is pressure sensitive adhesive 46, preferably a water-based acrylic PSA such as Gelva brand adhesives, such as Gelva Multipolymer Emulsion 3011 from Monsanto and Aroset brand adhesives, such as Aroset APS-1317 from Ashland Chemical Co. Other pressure sensitive adhesives such as the high-temperature rubber-based hot melt PSAs used for the first PSA layer can be used for the second as well. This second PSA layer is preferably 2 to 8 mils thick, more preferably 3 to 6 mils thick, more preferably 4 to 5 mils thick.

The first PSA layer 36 is applied to the upper release surface of the release liner 40 in a conventional manner, such as by slot die extrusion. The polymeric film layer 34 is then laminated or applied and adhered to the first PSA layer 36 in a conventional manner. Preferably, the flexible foam layer 32 is then provided and thermally bonded to the polymeric film layer 34 by providing the flexible foam in a liquid, uncured state (with blowing agent) on the polymeric film in a relatively thin layer and then heating or baking the material in an oven to activate the blowing agent, expand and cure the flexible foam and simultaneously thermally bond the flexible foam to the polymeric film 34. Second PSA layer 46 is applied to the flexible foam layer 32 after the flexible foam has been expanded and cured. Second PSA layer 46 is applied in a conventional manner, such as by reverse roll coating.

A preferred flexible plastic or polymeric foam is closed cell PVC foam, made of about 34 parts PVC dispersion resin such as Kaneka Prod. No. EH219, about 8 parts PVC blending resin such as Kaneka Prod. No. PBM B5F, about 39 parts phthalate plasticizer (88% phthalate plasticizer, 12% chlorinated paraffin), about 14 parts $CaCO_3$ filler, about 4 parts azodicarbonamide blowing agent, about 0.5 parts cell stabilizer such as Product VS103 from Air Products, about 0.5 parts heat stabilizer such as a zinc blend such as Ferro Prod. 5573, and about 0.5 parts epoxidized soybean oil plasticizer. Less preferably these amounts may be changed ±10%. Other components and optional ingredients known in the art may also be used. Substitute components known in the art may be used.

The expanded and cured flexible foam or PVC flexible foam preferably has a density of 5 to 20 or 5.5 to 15 or 5 to 5.5 to 6 to 7 to 8 to 9 to 10 to 12 to 15 to 20 $lb/ft^3$, more preferably 6–8 or 7–8 $lb/ft^3$. The flexible foam and PVC flexible foam preferably meets or exceeds the following requirements or specifications which are known in the art: GM 6086M Type 1A, GM 6086 Type 1B, GM 6086 II, MSAY-505, MS-AY511, ESB-M3G101-A Type 1, ESB-M3G77-A, and ESB-M3G102-A.

With reference to the preferred PVC formulation above, at room temperature the liquids are mixed and the powders are then blended in to yield a PVC plastisol, which is a liquid flexible foam precursor including a blowing agent. The substrate, which is the release liner 40 with first PSA layer 36 and polymeric film layer 34, is provided in a sheet preferably about 5 feet wide (less preferably at least 4, 3, 2 or 1 foot wide) and preferably at least 20, 50, 100, 200 or 300 feet long, rolled up. The substrate is slowly unrolled and the liquid PVC plastisol or flexible foam precursor with blowing agent, at room temperature, is cast or transferred or applied or provided in an appropriate thickness or layer to the polymeric film surface with a knife or similar coater. The substrate with PVC plastisol or flexible foam precursor is then transported into an oven where it is heated or baked at preferably about 400° F., less preferably about 380–420° F., for preferably about 3.5 min., less preferably about 3 to 4 minutes, to activate the blowing agent, to expand and cure the precursor and solidify the flexible foam and thermally bond it to the polymeric film layer 34. This operation yields a cured flexible foam layer which is thermally bonded to the polymeric film layer. If other liquid plastisols or flexible polymeric foam precursors are applied to the polymeric film surface, the time and temperature parameters are adjusted as known in the art to effectively expand and cure the flexible foam and thermally bond it to the polymeric film. The product is then removed from the oven and permitted to cool to room temperature. As a result of this operation the flexible foam layer is thermally bonded to the polymeric film layer.

The thermal bond between the flexible foam 32 and the polymeric film 34 is preferably such that the flexible foam itself will tear before the thermal bond will yield. Thus the bond strength is greater than the tear strength or tensile strength of the flexible foam.

The second PSA layer 46 is then applied to the cured and cooled flexible foam layer 32. The product is preferably transported to a second oven to cure or dry the second PSA layer 46 at preferably 130° C., less preferably from 120 to 135° C. for 40 to 180 seconds, more preferably 40 to 120 seconds, more preferably 40 to 60 seconds. Other times and temperatures can be used as known in the art and depending on the formulation of the second PSA layer 46.

The product is preferably produced as a sheet or length of material 30 (as shown in FIG. 1) about 5 feet wide and about or at least 20 to 50 to 100 to 200 to 300 feet long, depending on the thickness of the product. The product or length of material 30 is rolled up or wound around a high release thick, hard paper core (preferably 0.12 to 0.15 inches thick), typically into a roll or coil 2 to 3 feet in diameter. Thus the thicker the material, usually the shorter the length, so that the preferred diameter of the roll or coil is not exceeded. The rolls or coils. of the product are then provided to a slicing operation to cut the rolls to as narrow as ¼ to ⅜ to ½ to ⅝ to ¾ to 1 inch to 6 inches to 1 to 2 feet wide (thus at least ¼ or ⅜ or ½ or ⅝ or ¾ or 1 inch or 6 inches or 1 or 2 feet wide).

Figure 3:
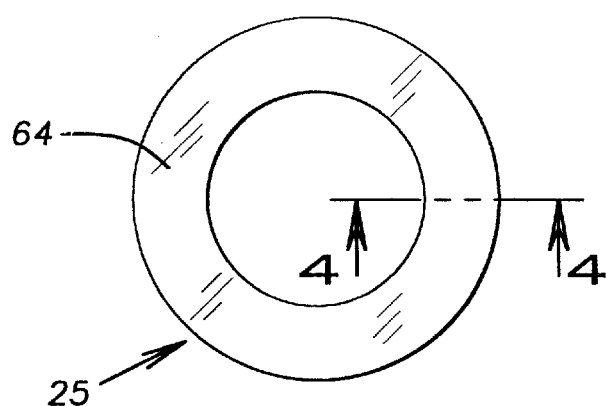
FIG. 3 is a top view of a die-cut double-sided self-adhesive foam tape of the present invention such as for use as a gasket.

In an alternate embodiment (illustrated in FIGS. 3 and 4 and similar to FIG. 2 as shown), a second release liner 66 comprising a release paper 64 having a release (preferably silicone) coating 62 which provides a release surface, may be applied to the second PSA layer 46 to yield a double-sided self-adhesive foam tape 25. The release paper 64 may have the same or different composition as the first release paper 42. In this embodiment, the first release liner 40 need not have release surface 44. This product 25 can be die-cut later in the process since it has release paper on both surfaces. If desired, the product can be provided in wider rolls, suitable for the die-cutting. The product can be provided in rolls less than 5, 4, 3, 2 or 1 feet wide, sometimes as narrow as 8–10 inches wide (thus at least 8 or 10 inches or 1, 2, 3 or 4 feet wide).

These tapes 25 that are die-cut may be shaped as circles (see FIG. 3), rings, squares, rectangles, figure-eights, and all sorts of other shapes known in the art, typically with most of the central area cut out leaving a perimeter wall typically ⅛ to ¼ to ½ to ¾ to 1 to 2 to 4 inches wide (which may or may not have cut out holes for fasteners). Alternatively the tape may have only small cut outs for bolt or screw or fastener holes etc. Alternatively the tape may be a strip ⅛ to ¼ to ½ to ¾ to 1 to 2 to 4 inches wide with or without cut out holes for fasteners, etc.

The process of the present invention produces less scrap loss than traditional processes, because it is a single continuous process. There are no losses associated with turning the product over, or with the start-up of a coextrusion process. As a result, the product can be produced with lower raw material costs.

The product is suitable for use in industrial mounting, construction, window glazing, in mounting steel panels in truck bodies, aluminum panels in light truck bodies, mirrors in automobiles, metal panels in furnace assemblies, etc. It is also suitable for use in mounting applications in the home, such as backing for mounting hooks. It can be used in the window-making industry, to fix planes of glass in a window-frame. The product can be used wherever double-sided foam tape is used, which uses are known in the art. If the embodiment which includes the second release liner is used, the product can also be used as a gasket, simply by not exposing the second adhesive surface. Alternatively it can be used as a gasket with both adhesive surfaces exposed.

Figure 4:
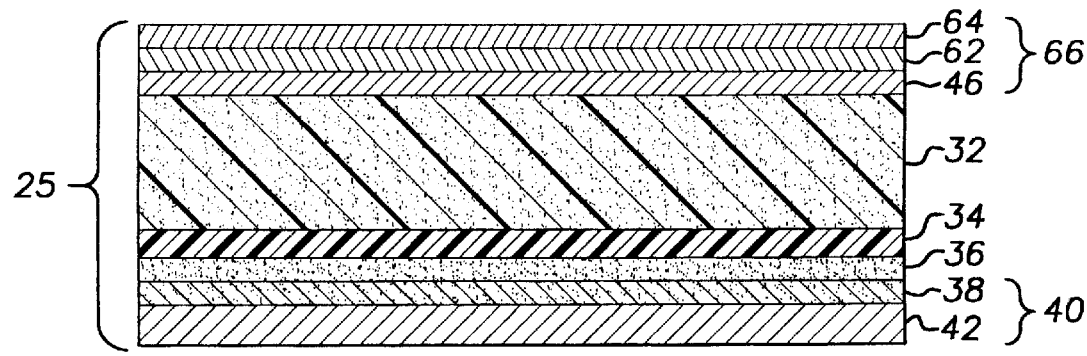
FIG. 4 is a schematic, cross-sectional view of the tape of FIG. 3 taken along line 4—4.

To apply the tape of FIG. 2, the product is unrolled, exposing an adhesive surface. The tape is then applied and pressed into position on a first substrate. The release liner is then removed, exposing a second adhesive surface. A second substrate or item is placed into contact with the second adhesive surface and pressed into position. The tape of FIG. 4 is applied in a similar fashion, removing both release liners in sequence to expose both adhesive surfaces.

Although particular embodiments of the invention have been described in detail, it is understood that the invention is not limited correspondingly in scope, but includes all changes and modifications coming within the spirit and terms of the claims appended hereto.

What is claimed is:

1. A double-sided self-adhesive reinforced foam tape comprising a release liner having upper and lower surfaces, at least the upper of which is a release surface, a first layer of pressure sensitive adhesive applied to said upper release surface, a layer of flexible polymeric film applied to said first pressure sensitive adhesive layer, a layer of flexible foam thermally bonded to said flexible polymeric film layer, and a second layer of pressure sensitive adhesive applied to said flexible foam layer, said tape having a shape such that said tape may be used effectively as a double-sided self-adhesive foam tape.

2. A tape according to claim 1, wherein said lower surface of said release liner is also a release surface.

3. A tape according to claim 1, wherein said flexible polymeric film is polyester film.

4. A tape according to claim 1, wherein said flexible foam is polyvinyl chloride flexible foam.

5. A tape according to claim 4, wherein said polyvinyl chloride flexible foam is closed cell polyvinyl chloride flexible foam.

6. A tape according to claim 5, said closed cell polyvinyl chloride flexible foam having a density of 5 to 20 lb/ft$^3$.

7. A tape according to claim 6, said flexible polymeric film being polyester film, said layer of flexible foam being 1/16 to ¾ inch thick.

8. A tape according to claim 1, wherein said second layer of pressure sensitive adhesive is a water-based acrylic adhesive.

9. A tape according to claim 1, further comprising a second release liner having a lower surface which is a release surface applied to said second layer of pressure sensitive adhesive.

10. A tape according to claim 9, said tape being a die-cut tape.

11. A tape according to claim 1, said layer of flexible foam being 1/16 to ¾ inch thick.

12. A tape according to claim 1, said flexible polymeric film layer being 0.5 to 4 mils thick.

13. A tape according to claim 1, said tape consisting essentially of said release liner, said first layer of pressure sensitive adhesive, said layer of flexible polymeric film, said layer of flexible foam and said second layer of pressure sensitive adhesive.

14. A tape according to claim 13, said tape consisting of said release liner, said first layer of pressure sensitive adhesive, said layer of flexible polymeric film, said layer of flexible foam and said second layer of pressure sensitive adhesive.

15. A length of material suitable for die-cutting a double-sided self-adhesive reinforced foam tape therefrom, said material comprising a first release liner having an upper surface which is a release surface, a first layer of pressure sensitive adhesive applied to said release surface, a layer of flexible polymeric film applied to said first pressure sensitive adhesive layer, a layer of flexible foam thermally bonded to said flexible polymeric film layer, a second layer of pressure sensitive adhesive applied to said flexible foam layer, a second release liner having a lower surface which is a release surface applied to said second layer of pressure sensitive adhesive, said length of material being at least eight inches wide and at least twenty feet long and being suitable for die-cutting a self-adhesive reinforced foam tape therefrom.

16. A length of material according to claim 15, said length of material being at least one foot wide and at least fifty feet long.

17. A length of material according to claim 15, wherein said flexible polymeric film is polyester film.

18. A length of material according to claim 15, wherein said flexible foam is closed cell polyvinyl chloride flexible foam.

19. A length of material according to claim 15, said layer of flexible foam being ¹⁄₁₆ to ¾ inch thick.

20. A length of material according to claim 15, said flexible foam having a density of 5 to 20 lb/ft$^3$.

21. A method of making a length of material suitable for use to provide a double-sided self-adhesive reinforced foam tape therefrom, said method comprising the steps of (a) providing a substrate comprising a release liner, a first layer of pressure sensitive adhesive and a layer of flexible polymeric film, said release liner having upper and lower surfaces which are release surfaces, said first pressure sensitive adhesive layer adhering to said upper release surface, said flexible polymeric film layer adhering to said first pressure sensitive adhesive layer, (b) providing and thermally bonding a layer of flexible foam to said flexible polymeric film layer and (c) providing and applying a second layer of pressure sensitive adhesive to said flexible foam layer to yield a length of material at least eight inches wide and at least twenty feet long and suitable for use to provide a self-adhesive reinforced foam tape therefrom.

22. A method according to claim 21, said step (b) including providing a layer of liquid flexible foam precursor including a blowing agent onto said flexible polymeric film layer, heating said flexible foam precursor, activating said blowing agent, and expanding and curing said precursor to yield a cured flexible foam layer which is thermally bonded to said flexible polymeric film layer.

23. A method of making a length of material suitable for die-cutting a self-adhesive reinforced foam tape therefrom, said method comprising the steps of (a) providing a substrate comprising a first release liner, a first layer of pressure sensitive adhesive and a layer of flexible polymeric film, said release liner having an upper surface which is a release surface, said first pressure sensitive adhesive layer adhering to said release surface, said flexible polymeric film layer adhering to said first pressure sensitive adhesive layer, (b) providing and thermally bonding a layer of flexible foam to said flexible polymeric film layer, (c) providing and applying a second layer of pressure sensitive adhesive to said flexible foam layer and (d) providing and applying a second release liner having a lower surface which is a release surface to the second layer of pressure sensitive adhesive to yield a length of material at least eight inches wide and at least twenty feet long and suitable for die-cutting a self-adhesive reinforced foam tape therefrom.

24. A method according to claim 23, said step (b) including providing a layer of liquid flexible foam precursor including a blowing agent onto said flexible polymeric film layer, heating said flexible foam precursor, activating said blowing agent, and expanding and curing said precursor to yield a cured flexible foam layer which is thermally bonded to said flexible polymeric film layer.

\* \* \* \* \*